A. A. RIGNY.
DEVICE FOR SUPPORTING TIRE CASINGS.
APPLICATION FILED FEB. 4, 1910.
963,808.
Patented July 12, 1910.
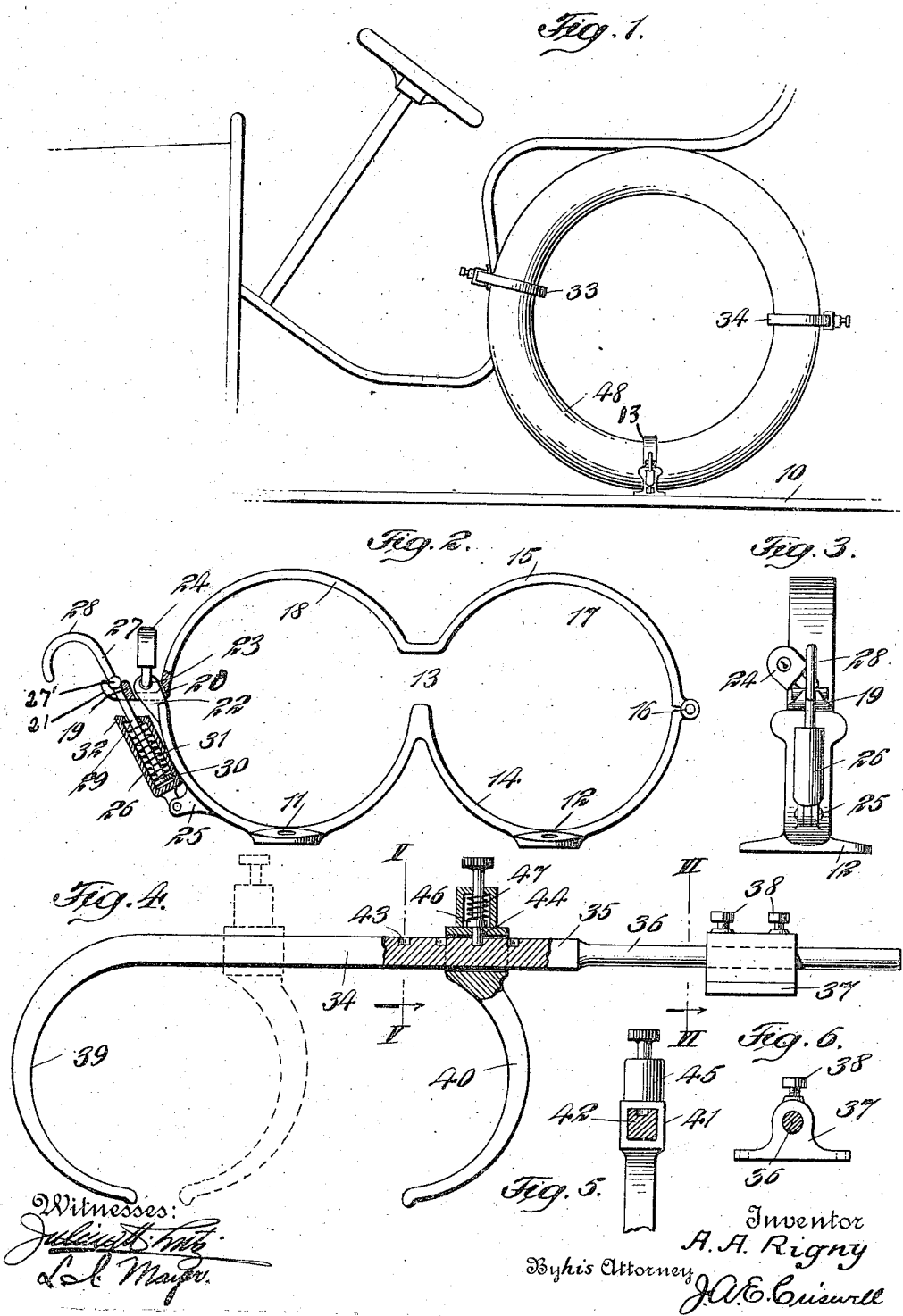

UNITED STATES PATENT OFFICE.

ARTHUR A. RIGNY, OF SUMMIT, NEW JERSEY.

DEVICE FOR SUPPORTING TIRE-CASINGS.

963,808.   Specification of Letters Patent.   Patented July 12, 1910.

Application filed February 4, 1910. Serial No. 542,122.

*To all whom it may concern:*

Be it known that I, ARTHUR A. RIGNY, a citizen of the United States, and a resident of Summit, county of Union, and State of New Jersey, have invented certain new and useful Improvements in Devices for Supporting Tire-Casings, of which the following is a full, clear, and exact description.

This invention relates more particularly to that type of devices adapted to support tire casings upon a vehicle.

The primary object of the invention is to provide a plurality of bracket members adapted to securely fasten one or more tire casings to a vehicle.

Another object of the invention is to so construct the bracket members that the same may be adjusted to accommodate and securely hold one or more tire casings.

With these and other objects in view, the invention will be hereinafter more particularly described with reference to the accompanying drawings, which form a part of this specification, and will then be pointed out in the claim at the end of the description.

In the drawings, Figure 1 is a view showing the bracket members attached to a vehicle. Fig. 2 is a view partly in section of one of the bracket members. Fig. 3 is an end view of said member. Fig. 4 is a view partly in section of another one of the bracket members. Fig. 5 is a section, taken on the line V—V looking in the direction of the arrow; and Fig. 6 is a section, taken on the line VI—VI looking in the direction of the arrow.

In the drawings 10 designates the running board of a motor vehicle, the portions 11 and 12 of the bracket member 13 being securely fastened to said running board by means of screws. Said member 13 consists of the two members 14 and 15 which are hingedly connected at 16 and each of these members is provided with two semi-circular portions 17 and 18. The free end of one of the members terminates in an extension 19 which is provided with an aperture 20 and a recessed off-set 21, said aperture being arranged at an angle. The member 14 terminates in an off-set 22 which is provided with an aperture 23. The member 22 is adapted to enter the opening 20 far enough for the lock 24 to engage the aperture 23, thereby securely locking the member 14 to the member 15. The member 14 is also provided with ears 25 between which is pivotally secured a hollow member 26, said hollow member 26 being adapted to resiliently support the member 27 which is adapted to form a spring catch for engaging a recess in the off-set portion of the member 15. This member 27 consists of the looped portion 28 which terminates in an extension 29 which is adapted to enter an opening in the hollow member 26, the end portion of said extension terminating in an annular enlargement 30, a coil spring 31 being interposed between said enlargement and the beveled end 32 of the member 26. A cross bar 27' being adapted to engage the extension 19 of the member 15. It will therefore, be seen that in securing the members 14 and 15 together that the member 22 may be inserted within the opening 21 and the pivoted spring pressed latch member 28 brought to the position shown in Fig. 2, thereby holding the two members together until the locking member 24 may be secured within the opening 23. The member 13 which, as before stated, is secured transversely on the running board 10 is adapted on account of its peculiar configuration to support two tire casings and hold the same against movement.

The additional means for supporting the casings consists of the two members 33 and 34 which are identical in structure. These members comprise a bar 35, one end of which is reduced and upon this end 36 is adjustably mounted an attaching means 37, said means consisting of a bracket adapted to slide on the portion 36 and provided with set screws 38 which pass through the same and engage the member 36. These bracket members are secured to the body of the vehicle and hold the portions 34 and 33 in position to engage the tire casings, the end portion of said members terminating in the curved extensions 39. Adjustably mounted upon said members are the members 40 which are curved to conform to the shape of the tire, said members are provided with a squared portion 41 and are adapted to slide upon the squared portion 42 of the members 33 and 34, said members 33 and 34 being provided with the counter-sunk portions 43 which are engaged by a spring pressed member 44 which is carried by the member 40. This member 44 is located within a housing 45 and is formed with an annular shoulder 46 which is adapted to support one end of a coil spring 47 the other end of said spring bearing against the end wall of the housing. It will be seen that said member 44 may be securely locked to the member 34 in such manner as to either engage one or two casings, Fig. 4 of the drawings showing the same in position to embrace a pair of casings.

When it is desired to attach the casings 48 to the vehicle the member 15 is swung upon its hinged portion and the tire or tires allowed to rest within the curved portions of the member 14. When the tires are in position, the member 15 is swung back and securely fastened, as shown in Fig. 2. The members 33 and 34 are then brought in contact with the tire and the member 40 so adjusted as to securely grip the same. In the event that two tires are being carried, the members 33 and 34 are adjusted to the position shown in Fig. 4. When it is desired to carry but one tire, the member 40 is brought to the position, shown in dotted lines in Fig. 4, thereby securely holding the tire in position.

It will be seen that a supporting device of this character will conveniently support the spare casings upon a vehicle, the device being so constructed and arranged as to take up but very little room. The peculiar manner of adjusting the supporting member being such that the casings may be quickly placed in position and at the same time held against movement which might be caused by the jolting of the vehicle.

Having thus described my invention, I claim as new and desire to secure by Letters Patent:—

A device of the class described, comprising a plurality of bracket members adapted to support a tire casing, one of said members being formed in two sections hingedly connected, a hollow member pivoted to one of said sections, and a hook resiliently supported within said hollow member for engaging the other section, an off-set formed upon one of said sections, said off-set being provided with an opening and a projection carried by the other section, said projection being formed with an opening, said projection being adapted to enter the opening in the first mentioned section, and means for securing the same within said opening.

This specification signed and witnessed this 2nd day of February A. D. 1910.

ARTHUR A. RIGNY.

Witnesses:
W. A. TOWNER, Jr.,
L. I. MAYER.